(12) United States Patent
Kim et al.

(10) Patent No.: US 9,787,448 B2
(45) Date of Patent: Oct. 10, 2017

(54) METHOD FOR TRANSMITTING AND RECEIVING PLANAR ANTENNA BASED REFERENCE SIGNAL IN WIRELESS COMMUNICATION SYSTEM AND APPARATUS THEREFOR

(71) Applicant: LG ELECTRONICS INC., Seoul (KR)

(72) Inventors: Kitae Kim, Anyang-si (KR); Sungho Park, Anyang-si (KR); Jaehoon Chung, Anyang-si (KR); Sunam Kim, Anyang-si (KR); Soocheol Kyeong, Anyang-si (KR); Jinmin Kim, Anyang-si (KR); Kyunghaeng Lee, Anyang-si (KR); Hyunsoo Ko, Anyang-si (KR); Jiwon Kang, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 42 days.

(21) Appl. No.: 14/763,761

(22) PCT Filed: Aug. 20, 2013

(86) PCT No.: PCT/KR2013/007453
§ 371 (c)(1),
(2) Date: Jul. 27, 2015

(87) PCT Pub. No.: WO2014/115941
PCT Pub. Date: Jul. 31, 2014

(65) Prior Publication Data
US 2015/0365948 A1    Dec. 17, 2015

Related U.S. Application Data

(60) Provisional application No. 61/757,209, filed on Jan. 27, 2013.

(51) Int. Cl.
*H04B 1/00* (2006.01)
*H04L 5/00* (2006.01)
(Continued)

(52) U.S. Cl.
CPC ......... *H04L 5/0048* (2013.01); *H04B 7/0456* (2013.01); *H04B 7/0469* (2013.01);
(Continued)

(58) Field of Classification Search
CPC .. H04B 7/0491; H04B 7/0617; H04B 7/0628; H04B 7/0634
See application file for complete search history.

(56) References Cited

U.S. PATENT DOCUMENTS 7,280,607 B2 * 10/2007 McCorkle ............... G01S 7/023
                                                              342/28
9,077,415 B2 *  7/2015 Josiam ................. H04B 7/0697
(Continued)

FOREIGN PATENT DOCUMENTS

KR    10-2010-0138261    12/2010
KR    10-2012-0031700     4/2012

OTHER PUBLICATIONS

Samsung, "Update of UL CoMP simulation assumption," 3GPP TSG-RAN WG1 Meeting #67, R1-114222, Nov. 2011, 11 pages.
(Continued)

*Primary Examiner* — Raj Jain
(74) *Attorney, Agent, or Firm* — Lee Hong Degerman Kang & Waimey

(57) ABSTRACT

A method for transmitting signals to a user equipment at a base station in a wireless communication system is disclosed. The method includes generating a user equipment specific reference signal sequence for the user equipment, determining transmission resources for mapping the user equipment specific reference signal sequence, based on a
(Continued)

vertical sector in which the user equipment is located, mapping the user equipment specific reference signal sequence to the determined transmission resources, and transmitting the user equipment specific reference signal sequence to the user equipment using a second-dimensional planar antenna.

8 Claims, 12 Drawing Sheets

(51) Int. Cl.
  *H04B 7/0456* (2017.01)
  *H04B 7/04* (2017.01)
  *H04B 7/06* (2006.01)
  *H04W 72/04* (2009.01)
(52) U.S. Cl.
  CPC ......... *H04B 7/0617* (2013.01); *H04B 7/0628* (2013.01); *H04B 7/0634* (2013.01); *H04W 72/0453* (2013.01)

(56) References Cited

U.S. PATENT DOCUMENTS

| | | | |
|---|---|---|---|
| 9,100,068 B2* | 8/2015 | Lakkis | H04B 7/0491 |
| 2003/0161411 A1* | 8/2003 | McCorkle | G01S 7/023 |
| | | | 375/295 |
| 2006/0140644 A1* | 6/2006 | Paolella | H03F 3/08 |
| | | | 398/189 |
| 2009/0232245 A1 | 9/2009 | Lakkis | |
| 2010/0054200 A1 | 3/2010 | Tsai | |
| 2012/0057562 A1* | 3/2012 | Kim | H04B 7/0452 |
| | | | 370/329 |
| 2012/0155423 A1* | 6/2012 | Kishiyama | H04B 7/0678 |
| | | | 370/330 |
| 2013/0156120 A1* | 6/2013 | Josiam | H04B 7/0697 |
| | | | 375/260 |
| 2014/0192762 A1* | 7/2014 | Li | H04L 25/03929 |
| | | | 370/329 |
| 2015/0105025 A1* | 4/2015 | Zhang | H01Q 3/26 |
| | | | 455/63.4 |
| 2015/0365948 A1* | 12/2015 | Kim | H04L 5/0048 |
| | | | 370/329 |

OTHER PUBLICATIONS

PCT International Application No. PCT/KR2013/007453, Written Opinion of the International Searching Authority dated Nov. 25, 2013, 9 pages.

* cited by examiner

E-UMTS

FIG. 2
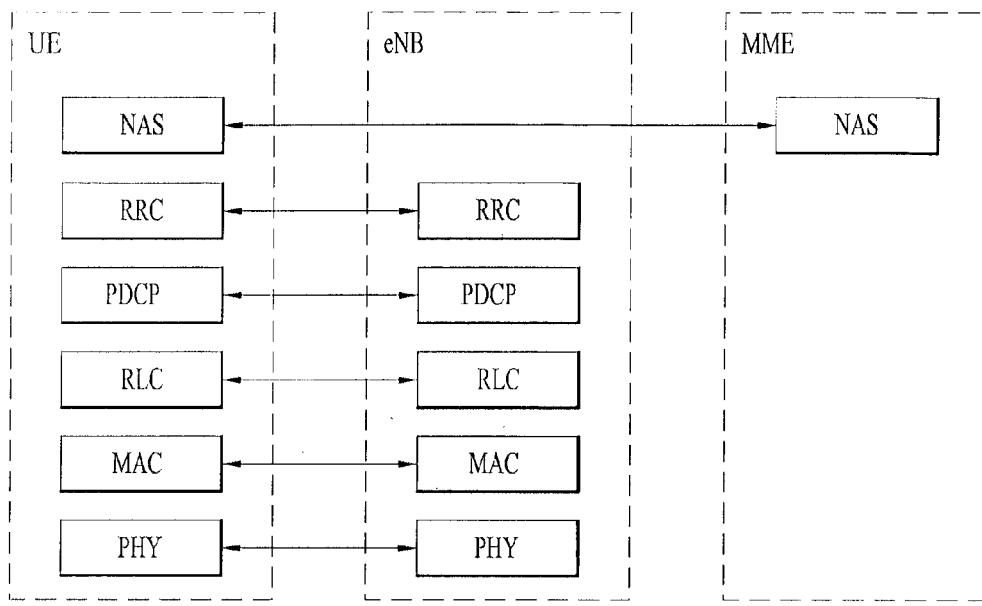
(a) Control-plane protocol stack
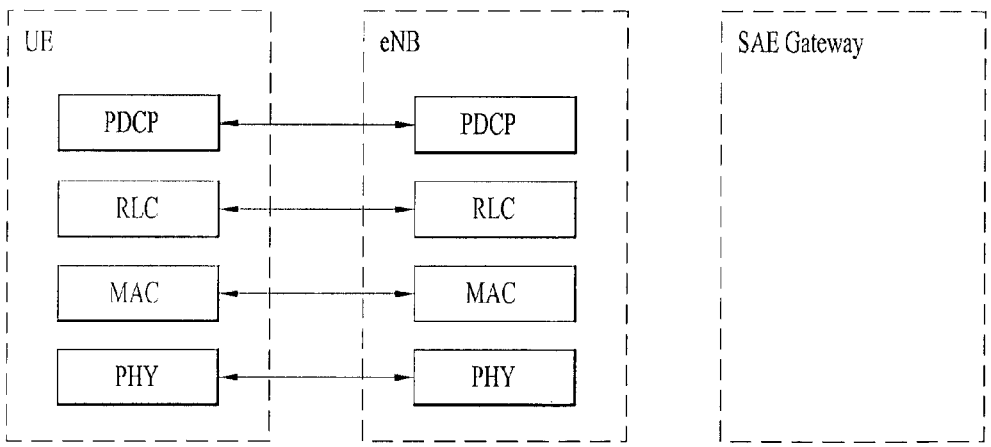
(b) User-plane protocol stack FIG. 8
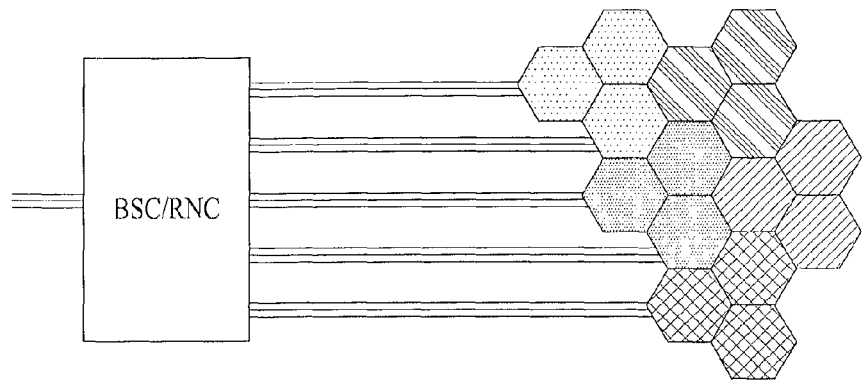
(a)
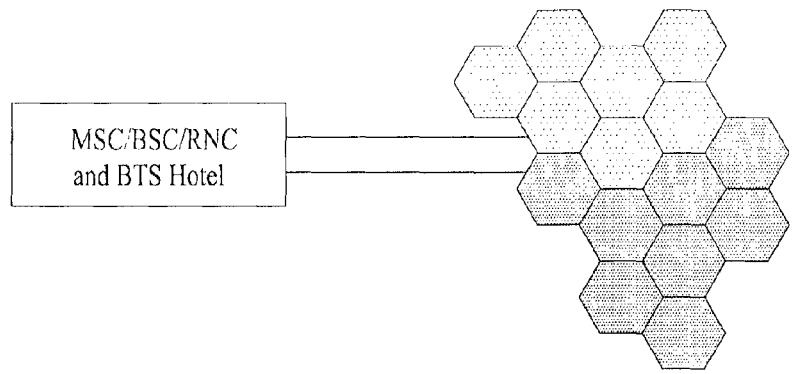
(b)
FIG. 9
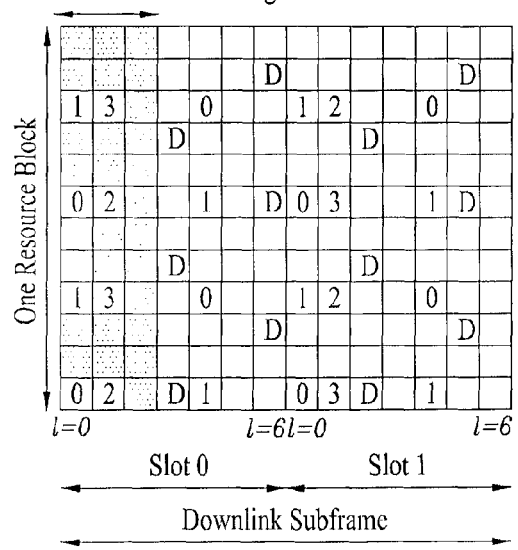

▨ : DM-RS Group 1

▧ : DM-RS Group 2

FIG. 12
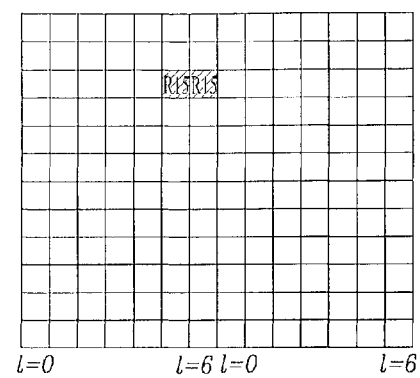
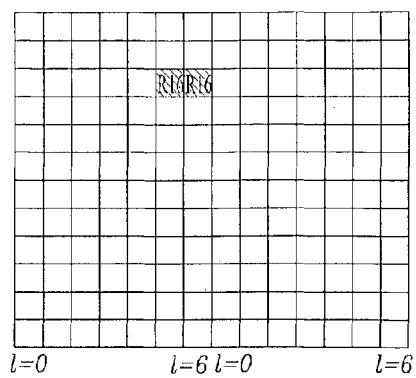
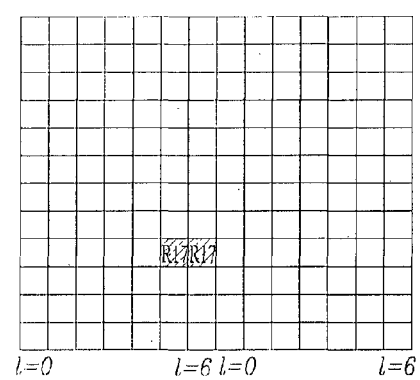
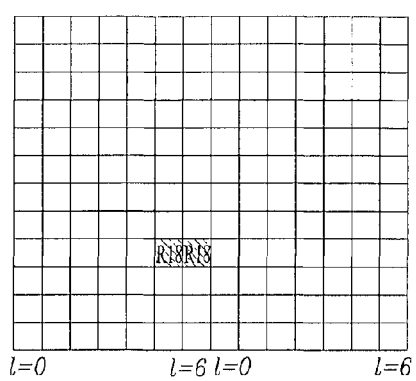
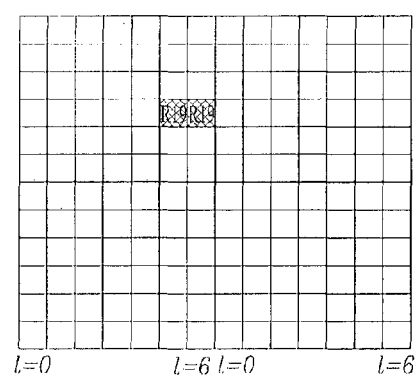
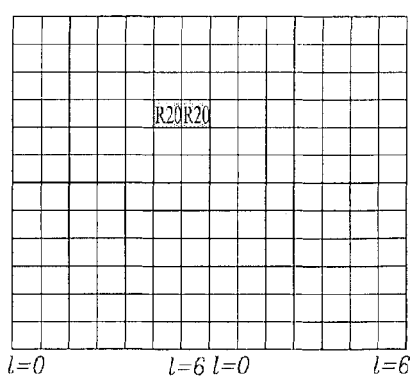
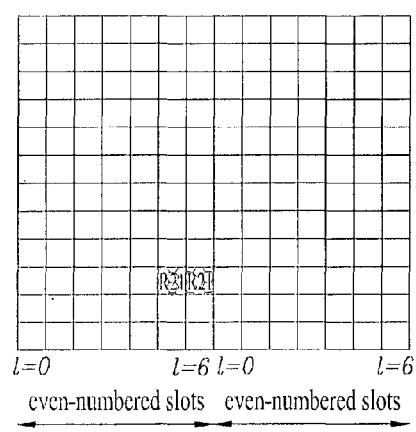
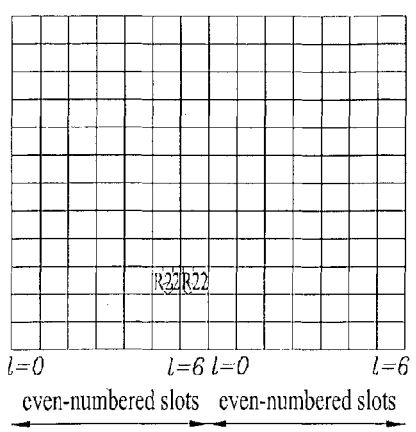

METHOD FOR TRANSMITTING AND RECEIVING PLANAR ANTENNA BASED REFERENCE SIGNAL IN WIRELESS COMMUNICATION SYSTEM AND APPARATUS THEREFOR

CROSS-REFERENCE TO RELATED APPLICATIONS

This application is the National Stage filing under 35 U.S.C. 371 of International Application No. PCT/KR2013/007453, filed on Aug. 20, 2013, which claims the benefit of U.S. Provisional Application No. 61/757,209, filed on Jan. 27, 2013, the contents of which are all hereby incorporated by reference herein in their entirety.

TECHNICAL FIELD

The present invention relates to a wireless communication system, and more particularly, to a method for transmitting and receiving a planar antenna based reference signal in a wireless communication system, and an apparatus therefor.

BACKGROUND ART

As an example of a mobile communication system to which the present invention is applicable, a 3rd Generation Partnership Project Long Term Evolution (hereinafter, referred to as LTE) communication system is described in brief.

FIG. 1 is a view schematically illustrating a network structure of an E-UMTS as an exemplary radio communication system. An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. For details of the technical specifications of the UMTS and E-UMTS, reference can be made to Release 7 and Release 8 of "3rd Generation Partnership Project; Technical Specification Group Radio Access Network".

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells are present per eNB. A cell is configured to use one of bandwidths of 1.44, 3, 5, 10, 15, and 20 MHz to provide a downlink or uplink transport service to several UEs. Different cells may be set to provide different bandwidths. The eNB controls data transmission and reception for a plurality of UEs. The eNB transmits downlink scheduling information with respect to downlink data to notify a corresponding UE of a time/frequency domain in which data is to be transmitted, coding, data size, and Hybrid Automatic Repeat and reQuest (HARQ)-related information. In addition, the eNB transmits uplink scheduling information with respect to uplink data to a corresponding UE to inform the UE of an available time/frequency domain, coding, data size, and HARQ-related information. An interface may be used to transmit user traffic or control traffic between eNBs. A Core Network (CN) may include the AG, a network node for user registration of the UE, and the like. The AG manages mobility of a UE on a Tracking Area (TA) basis, each TA including a plurality of cells.

Although radio communication technology has been developed up to LTE based on Wideband Code Division Multiple Access (WCDMA), demands and expectations of users and providers continue to increase. In addition, since other radio access technologies continue to be developed, new advances in technology are required to secure future competitiveness. For example, decrease of cost per bit, increase of service availability, flexible use of a frequency band, simple structure, open interface, and suitable power consumption by a UE are required.

DISCLOSURE

Technical Problem

Based on the above discussion, the present invention proposes a method for transmitting and receiving a planar antenna based reference signal in a wireless communication system, and an apparatus therefor.

Technical Solution

In accordance with an embodiment of the present invention, a method for transmitting signals to a user equipment at a base station in a wireless communication system includes generating a user equipment specific reference signal sequence for the user equipment, determining transmission resources for mapping the user equipment specific reference signal sequence, based on a vertical sector in which the user equipment is located, mapping the user equipment specific reference signal sequence to the determined transmission resources, and transmitting the user equipment specific reference signal sequence to the user equipment using a second-dimensional planar antenna. The determination may include determining the transmission resources to be orthogonal in each vertical sector managed by the base station.

The determination may include defining indexes of logical antenna ports for the user equipment specific reference signal in order of physical antenna ports to which the user equipment specific reference signal is allocated and determining a starting index of logical antenna ports for the user equipment.

The determination may include transmitting information about antenna ports of a zero-power user equipment specific reference signal corresponding to the vertical sector to the user equipment and determining the transmission resource as at least one antenna port except for the antenna ports of the zero-power user equipment specific reference signal.

In accordance with another embodiment of the present invention, a method for receiving signals from a base station at a user equipment in a wireless communication system includes receiving a user equipment specific reference signal sequence from the base station using a second-dimensional planar antenna, wherein resources for the user equipment specific reference signal sequence is determined to be orthogonal in each vertical sector in which the user equipment is located.

The method may further include receiving information about a starting index of logical antenna ports for the user equipment from the base station, wherein a starting index of logical antenna ports for the user equipment specific reference signal is defined in order of physical antenna ports to which the user equipment specific reference signal is allocated.

The method may further include receiving information about antenna ports of a zero-power user equipment specific reference signal corresponding to the vertical sector from the base station and determining the resources for the user equipment reference signal sequence as at least one antenna port except for the antenna ports of the zero-power user equipment specific reference signal.

In accordance with an embodiment of the present invention, a base station in a wireless communication system includes a radio communication module for transmitting and receiving signals to and from a user equipment and a processor for processing the signals, wherein the processor controls the radio communication module to generate a user equipment specific reference signal sequence for the user equipment, determine transmission resources for mapping the user equipment specific reference signal sequence, based on a vertical sector in which the user equipment is located, map the user equipment specific reference signal sequence to the determined transmission resources, and transmit the user equipment specific reference signal sequence to the user equipment using a second-dimensional planar antenna.

In accordance with another embodiment of the present invention, a user equipment in a wireless communication system includes a radio communication module for transmitting and receiving signals to and from a base station and a processor for processing the signals, wherein the processor controls the radio communication module to receive a user equipment specific reference signal sequence from the base station using a second-dimensional planar antenna, and wherein resources for the user equipment specific reference signal sequence is determined to be orthogonal in each vertical sector in which the user equipment is located.

In the above embodiments, the base station may define a plurality of physical antenna ports by grouping antennas included in the second-dimensional planar antenna. The vertical sector may be a cell coverage region formed according to vertical direction beamforming of the second-dimensional planar antenna.

Advantageous Effects

According to embodiments of the present invention, a base station and a user equipment can more efficiently transmit and receive a reference signal considering characteristics of a planar antenna in a wireless communication system.

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

FIG. 2 is a view illustrating structures of a control plane and a user plane of a radio interface protocol between a UE and an E-UTRAN based on the 3GPP radio access network specification;

FIG. 8 is a view illustrating the concept of a BTS hotel in a DAS;

FIG. 9 and FIG. 10 are views illustrating the structure of downlink RSs in an LTE system supporting downlink transmission using four antennas;

FIG. 12 illustrates CSI-RS configuration #0 in a normal CP among downlink CSI-RS configurations defined in the current 3GPP standard document;

BEST MODE

Figure 1:
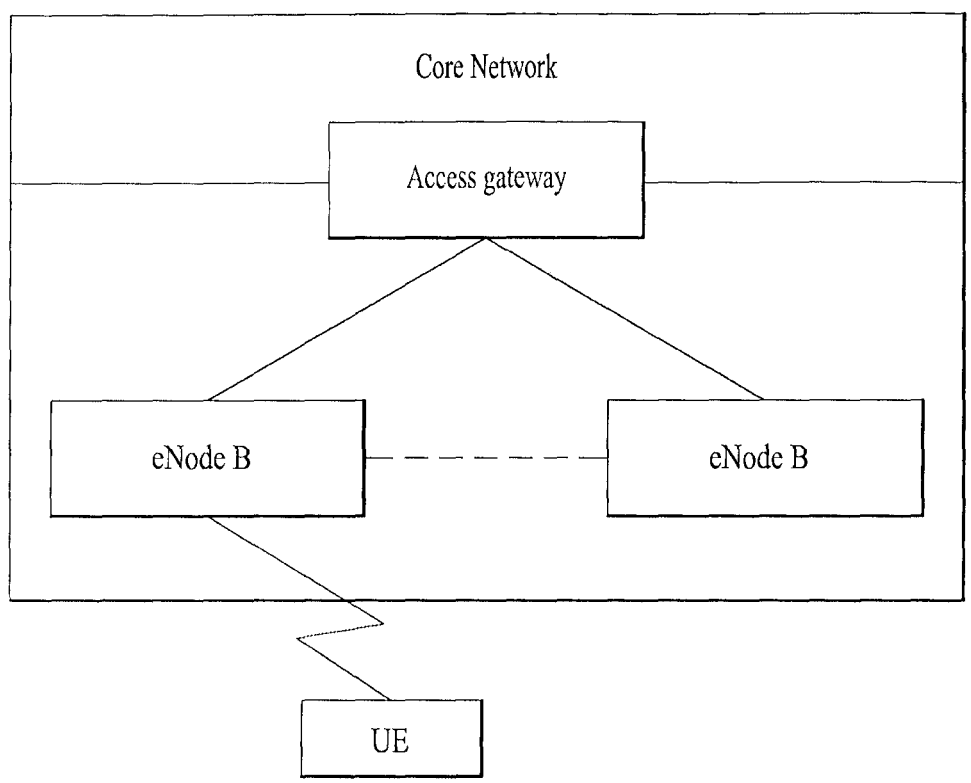
FIG. 1 is a view schematically illustrating a network structure of an E-UMTS as an exemplary radio communication system.

Hereinafter, structures, operations, and other features of the present invention will be readily understood from the embodiments of the present invention, examples of which are illustrated in the accompanying drawings. Embodiments described later are examples in which technical features of the present invention are applied to a 3GPP system.

Although the embodiments of the present invention will be described based on an LTE system and an LTE-Advanced (LTE-A) system, the LTE system and the LTE-A system are only exemplary and the embodiments of the present invention can be applied to all communication systems in accordance with the aforementioned definition. In addition, although the embodiments of the present invention will be described based on FDD mode, the FDD mode is only exemplary and the embodiments of the present invention can easily be applied to H-FDD mode or TDD mode.

FIG. 2 is a view illustrating structures of a control plane and a user plane of a radio interface protocol between a UE and an E-UTRAN based on the 3GPP radio access network specification. The control plane refers to a path used for transmission of control messages, which are used by a UE and a network to manage a call. The user plane refers to a path used for transmitting data generated in an application layer, e.g., voice data or Internet packet data.

A physical layer of a first layer provides an information transfer service to an upper layer using a physical channel. The physical layer is connected to a Medium Access Control (MAC) layer of an upper layer via a transport channel. Data is transported between the MAC layer and the physical layer via the transport channel. Data is also transported between a physical layer of a transmitting side and a physical layer of a receiving side via a physical channel. The physical channel uses time and frequency as radio resources. Specifically, the physical channel is modulated using an Orthogonal Frequency Division Multiple Access (OFDMA)

scheme in downlink and is modulated using a Single-Carrier Frequency Division Multiple Access (SC-FDMA) scheme in uplink.

A Medium Access Control (MAC) layer of a second layer provides a service to a Radio Link Control (RLC) layer of an upper layer via a logical channel. The RLC layer of the second layer supports reliable data transmission. The function of the RLC layer may be implemented by a functional block within the MAC. A Packet Data Convergence Protocol (PDCP) layer of the second layer performs a header compression function to reduce unnecessary control information for efficient transmission of an Internet Protocol (IP) packet such as an IPv4 or IPv6 packet in a radio interface having a relatively narrow bandwidth.

A Radio Resource Control (RRC) layer located at the bottommost portion of a third layer is defined only in the control plane. The RRC layer controls logical channels, transport channels, and physical channels in relation to configuration, re-configuration, and release of radio bearers. Radio bearer refers to a service provided by the second layer to transmit data between the UE and the network. To this end, the RRC layer of the UE and the RRC layer of the network exchange RRC messages. The UE is in an RRC connected mode if an RRC connection has been established between the RRC layer of the radio network and the RRC layer of the UE. Otherwise, the UE is in an RRC idle mode. A Non-Access Stratum (NAS) layer located at an upper level of the RRC layer performs functions such as session management and mobility management.

One cell of the eNB is set to use one of bandwidths such as 1.4, 3, 5, 10, 15, and 20 MHz to provide a downlink or uplink transmission service to UEs. Different cells may be set to provide different bandwidths.

Downlink transport channels for data transmission from the network to the UE include a Broadcast Channel (BCH) for transmitting system information, a Paging Channel (PCH) for transmitting paging messages, and a downlink Shared Channel (SCH) for transmitting user traffic or control messages. Traffic or control messages of a downlink multicast or broadcast service may be transmitted through the downlink SCH or may be transmitted through an additional downlink Multicast Channel (MCH). Meanwhile, uplink transport channels for data transmission from the UE to the network include a Random Access Channel (RACH) for transmitting initial control messages and an uplink SCH for transmitting user traffic or control messages. Logical channels, which are located at an upper level of the transport channels and are mapped to the transport channels, include a Broadcast Control Channel (BCCH), a Paging Control Channel (PCCH), a Common Control Channel (CCCH), a Multicast Control Channel (MCCH), and a Multicast Traffic Channel (MTCH).

Figure 3:
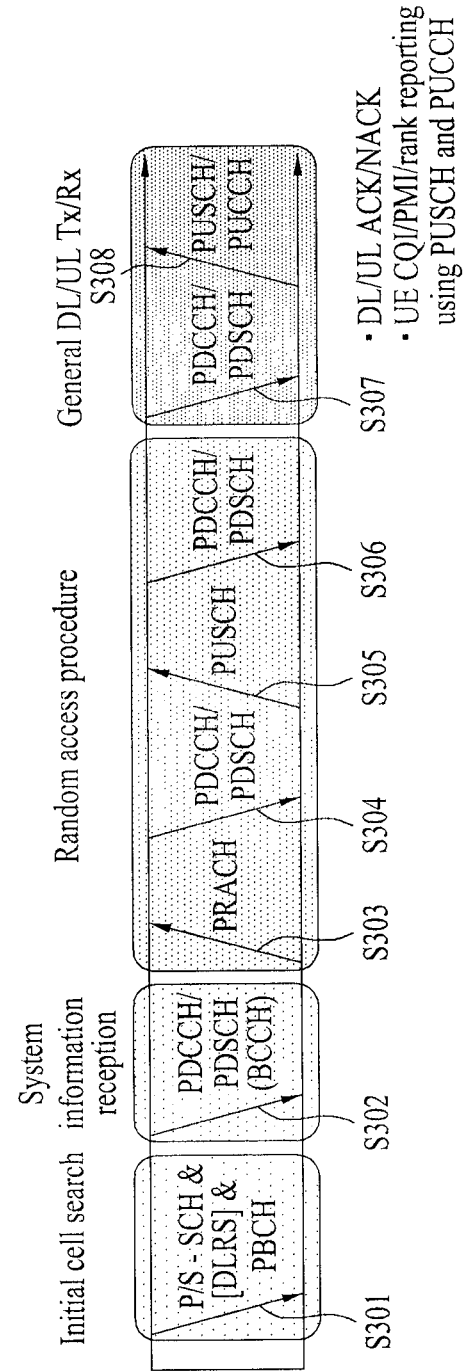
FIG. 3 is a view illustrating physical channels used in a 3GPP system and a general signal transmission method using the same.

FIG. 3 is a view illustrating physical channels used in a 3GPP system and a general signal transmission method using the same.

A UE performs initial cell search such as establishment of synchronization with an eNB when power is turned on or the UE enters a new cell (step S301). The UE may receive a Primary Synchronization Channel (P-SCH) and a Secondary Synchronization Channel (S-SCH) from the eNB, establish synchronization with the eNB, and acquire information such as a cell identity (ID). Thereafter, the UE may receive a physical broadcast channel from the eNB to acquire broadcast information within the cell. Meanwhile, the UE may receive a Downlink Reference Signal (DL RS) in the initial cell search step to confirm a downlink channel state.

Upon completion of the initial cell search, the UE may receive a Physical Downlink Control Channel (PDCCH) and a Physical Downlink Shared Channel (PDSCH) according to information included in the PDCCH to acquire more detailed system information (step S302).

Meanwhile, if the UE initially accesses the eNB or if radio resources for signal transmission are not present, the UE may perform a random access procedure (steps S303 to S306) with respect to the eNB. To this end, the UE may transmit a specific sequence through a Physical Random Access Channel (PRACH) as a preamble (steps S303 and S305), and receive a response message to the preamble through the PDCCH and the PDSCH corresponding thereto (steps S304 and S306). In the case of a contention-based RACH, a contention resolution procedure may be additionally performed.

The UE which performs the above procedures may receive a PDCCH/PDSCH (step S307) and transmit a Physical Uplink Shared Channel (PUSCH)/Physical Uplink Control Channel (PUCCH) (step S308) according to a general uplink/downlink signal transmission procedure. Especially, the UE receives Downlink Control Information (DCI) through the PDCCH. The DCI includes control information such as resource allocation information for the UE and has different formats according to use purpose.

Meanwhile, control information transmitted by the UE to the eNB through uplink or received by the UE from the eNB through downlink includes a downlink/uplink ACKnowledgment/Negative ACKnowledgment (ACK/NACK) signal, a Channel Quality Indicator (CQI), a Precoding Matrix Index (PMI), a Rank Indicator (RI), and the like. In the case of the 3GPP LTE system, the UE may transmit the control information such as CQI/PMI/RI through the PUSCH and/or the PUCCH.

Hereinafter, a MIMO system will be described. MIMO refers to a method of using multiple transmit antennas and multiple receive antennas to improve data transmission/reception efficiency. Namely, a plurality of antennas is used at a transmitting end or a receiving end of a wireless communication system so that capacity can be increased and performance can be improved. MIMO may also be referred to as 'multi-antenna' in this disclosure.

MIMO technology does not depend on a single antenna path in order to receive a whole message. Instead, MIMO technology collects data fragments received via several antennas, merges the data fragments, and forms complete data. The use of MIMO technology can increase system coverage while improving data transfer rate within a cell area of a specific size or guaranteeing a specific data transfer rate. MIMO technology can be widely used in mobile communication terminals and relay nodes. MIMO technology can overcome the limitations of the restricted amount of transmission data of single antenna based mobile communication systems.

Figure 4:
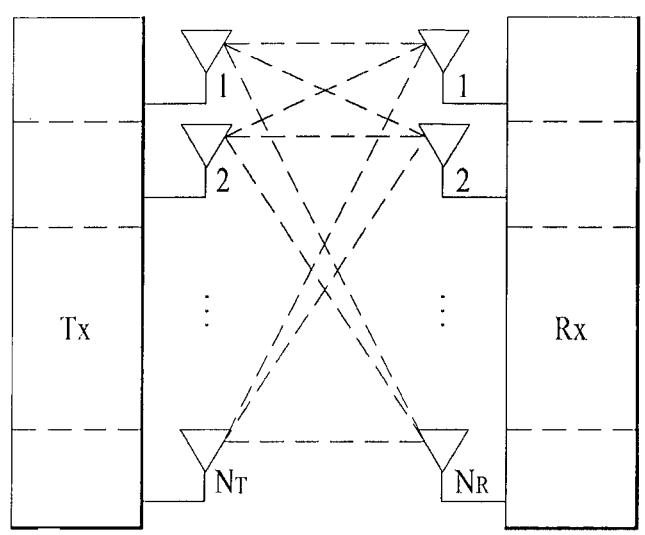
FIG. 4 is a view illustrating the configuration of a MIMO communication system.

The configuration of a MIMO communication system described in the present invention is shown in FIG. 4. A transmitting end is equipped with $N_T$ transmit (Tx) antennas and a receiving end is equipped with $N_R$ receive (Rx) antennas. If a plurality of antennas is used both at the transmitting end and at the receiving end, theoretical channel transmission capacity increases unlike the case in which only either the transmitting end or the receiving end uses a plurality of antennas. Increase in channel transmission capacity is proportional to the number of antennas, thereby improving transfer rate and frequency efficiency. If a maximum transfer rate using a signal antenna is $R_o$, a transfer rate using multiple antennas can be theoretically increased by the product of the maximum transfer rate $R_o$ by a rate increment $R_i$. The rate increment $R_i$ is represented by the following equation 1 where Ri is the smaller of $N_T$ and $N_R$.

$$R_i = \min(N_T, N_R) \quad \text{[Equation 1]}$$

For example, in a MIMO communication system using four Tx antennas and four Rx antennas, it is possible to theoretically acquire a transfer rate four times that of a single antenna system. After theoretical increase in capacity provided by the MIMO system was first demonstrated in the mid-1990s, various techniques for substantially improving data transfer rate have been under development. Several of these techniques have already been incorporated into a variety of wireless communication standards including, for example, third generation mobile communication and next-generation wireless local area networks.

Active research up to now related to MIMO technology has focused upon a number of different aspects, including research into information theory related to MIMO communication capacity calculation in various channel environments and in multiple access environments, research into wireless channel measurement and model derivation of MIMO systems, and research into space-time signal processing technologies for improving transmission reliability and transfer rate.

To describe a communication method in a MIMO system in detail, a mathematical model thereof is given below. As shown in FIG. 4, it is assumed that $N_T$ Tx antennas and $N_R$ Rx antennas are present. In the case of a transmission signal, a maximum number of transmittable pieces of information is $N_T$ under the condition that $N_T$ Tx antennas are used, so that transmission information can be represented by a vector represented by the following equation 2.

$$S = [S_1, S_2, \ldots, S_{N_T}]^T \quad \text{[Equation 2]}$$

Meanwhile, individual transmission information pieces $S_1, S_2, \ldots, S_{N_T}$ may have different transmission powers. In this case, if the individual transmission powers are denoted by $P_1, P_2, \ldots, P_{N_T}$, transmission information having adjusted transmission powers can be represented by a vector shown in the following equation 3.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

The transmission power-controlled transmission information vector ŝ may be expressed as follows, using a diagonal matrix P of a transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

Meanwhile, $N_T$ transmission signals $x_1, x_2, \ldots, x_{N_T}$ to be actually transmitted may be configured by multiplying the transmission power-controlled information vector Ŝ by a weight matrix W. In this case, the weight matrix is adapted to properly distribute transmission information to individual antennas according to transmission channel situations. The transmission signals $x_1, x_2, \ldots, x_{N_T}$ can be represented by the following Equation 5 using a vector X. In Equation 5, $W_{ij}$ is a weight between the i-th Tx antenna and the j-th information and W is a weight matrix, which may also be referred to as a precoding matrix.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \ldots & w_{1N_T} \\ w_{21} & w_{22} & \ldots & w_{2N_T} \\ \vdots & & \ddots & \vdots \\ w_{i1} & w_{i2} & \ldots & w_{iN_T} \\ \vdots & & \ddots & \vdots \\ w_{N_T 1} & w_{N_T 2} & \ldots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \quad \text{[Equation 5]}$$

Generally, the physical meaning of a rank of a channel matrix may be a maximum number of different pieces of information that can be transmitted in a given channel. Accordingly, since the rank of the channel matrix is defined as the smaller of the number of rows or columns, which are independent of each other, the rank of the matrix is not greater than the number of rows or columns. A rank of a channel matrix H, rank(H), is restricted as follows.

$$\text{rank}(H) \leq \min(N_T, N_R) \quad \text{[Equation 6]}$$

Each unit of different information transmitted using MIMO technology is defined as a 'transmission stream' or simply 'stream'. The 'stream' may be referred to as a 'layer'. The number of transmission streams is not greater than a rank of a channel which is a maximum number of different pieces of transmittable information. Accordingly, the channel matrix H may be indicted by the following Equation 7.

$$\text{\# of steams} \leq \text{rank}(H) \leq \min(N_T, N_R) \quad \text{[Equation 7]}$$

Here, '# of streams' denotes the number of streams. It should be noted that one stream may be transmitted through one or more antennas.

There may be various methods of allowing one or more streams to correspond to multiple antennas. These methods may be described as follows according to types of MIMO technology. The case in which one stream is transmitted via multiple antennas may be called spatial diversity, and the case in which multiple streams are transmitted via multiple antennas may be called spatial multiplexing. It is also possible to configure a hybrid of spatial diversity and spatial multiplexing.

Figure 5:
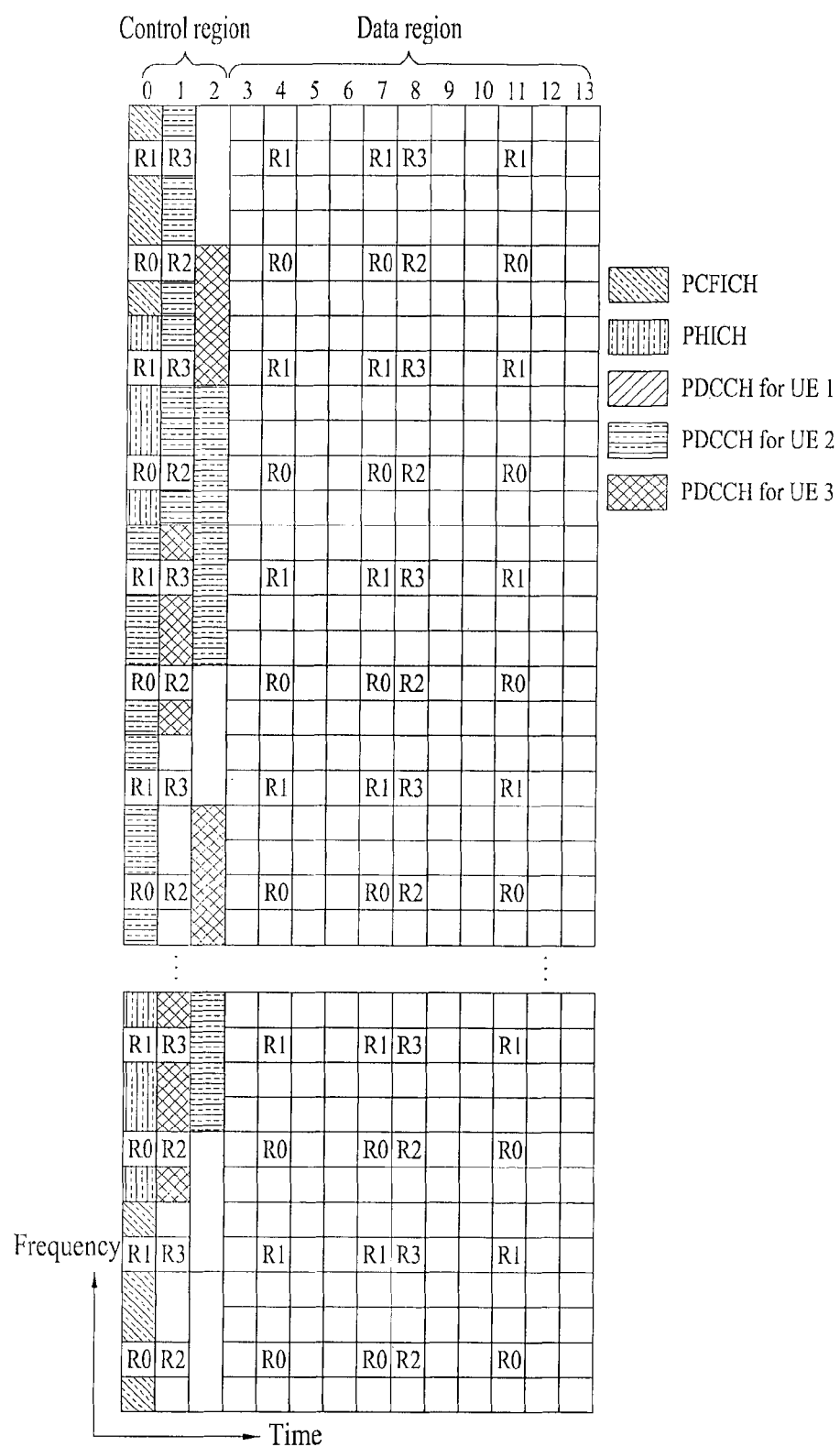
FIG. 5 is a view illustrating the structure of a downlink radio frame used in an LTE system.

FIG. 5 is a view illustrating control channels contained in a control region of one subframe in a downlink radio frame.

Referring to FIG. 5, one subframe includes 14 OFDM symbols. The first to third ones of the 14 OFDM symbols may be used as a control region and the remaining 13 to 11 OFDM symbols may be used as a data region, according to a subframe configuration. In FIG. 5, R1 to R4 represent reference signals (RSs) or pilot signals for antennas 0 to 3, respectively. The RSs are fixed to a predetermined pattern within the subframe irrespective of the control region and the data region. Control channels are allocated to resources to which the RS is not allocated in the control region. Traffic channels are allocated to resources, to which the RS is not allocated, in the data region. The control channels allocated to the control region include a Physical Control Format Indicator Channel (PCFICH), a Physical Hybrid-ARQ Indicator Channel (PHICH), a Physical Downlink Control Channel (PDCCH), etc.

The PCFICH, physical control format indicator channel, informs a UE of the number of OFDM symbols used for the PDCCH per subframe. The PCFICH is located in the first OFDM symbol and is established prior to the PHICH and the PDCCH. The PCFICH is comprised of 4 Resource Element Groups (REGs) and each of the REGs is distributed in the control region based on a cell ID. One REG includes 4 Resource Elements (REs). The RE indicates a minimum physical resource defined as one subcarrier x one OFDM symbol. The PCFICH value indicates values of 1 to 3 or values of 2 to 4 depending on bandwidth and is modulated by Quadrature Phase Shift Keying (QPSK).

The PHICH, physical Hybrid-ARQ indicator channel, is used to transmit a HARQ ACK/NACK signal for uplink transmission. That is, the PHICH indicates a channel through which downlink ACK/NACK information for uplink HARQ is transmitted. The PHICH includes one REG and is cell-specifically scrambled. The ACK/NACK signal is indicated by 1 bit and is modulated by Binary Phase Shift Keying (BPSK). The modulated ACK/NACK signal is spread by a Spreading Factor (SF)=2 or 4. A plurality of PHICHs mapped to the same resource constitutes a PHICH group. The number of PHICHs multiplexed to the PHICH group is determined depending on the number of SFs. The PHICH (group) is repeated three times to obtain diversity gain in a frequency domain and/or a time domain.

The PDCCH is allocated to the first n OFDM symbols of a subframe. In this case, n is an integer greater than 1 and is indicated by the PCFICH. The PDCCH is comprised of one or more control Channel Elements (CCEs). The PDCCH informs each UE or UE group of information associated with resource allocation of a Paging Channel (PCH) and a Downlink-Shared Channel (DL-SCH), uplink scheduling grant, Hybrid Automatic Repeat Request (HARQ) information, etc. Therefore, an eNB and a UE transmit and receive data other than specific control information or specific service data through the PDSCH.

Information indicating to which UE or UEs PDSCH data is to be transmitted, information indicating how UEs are to receive PDSCH data, and information indicating how UEs are to perform decoding are contained in the PDCCH. For example, it is assumed that a specific PDCCH is CRC-masked with a Radio Network Temporary Identity (RNTI) 'A' and information about data, that is transmitted using radio resources 'B' (e.g., frequency location) and transport format information 'C' (e.g., transmission block size, modulation scheme, coding information, etc.), is transmitted through a specific subframe. In this case, a UE located in a cell monitors the PDCCH using its own RNTI information. If one or more UEs having the RNTI 'A' are present, the UEs receive the PDCCH and receive the PDSCH indicated by 'B' and 'C' through the received PDCCH information.

Figure 6:
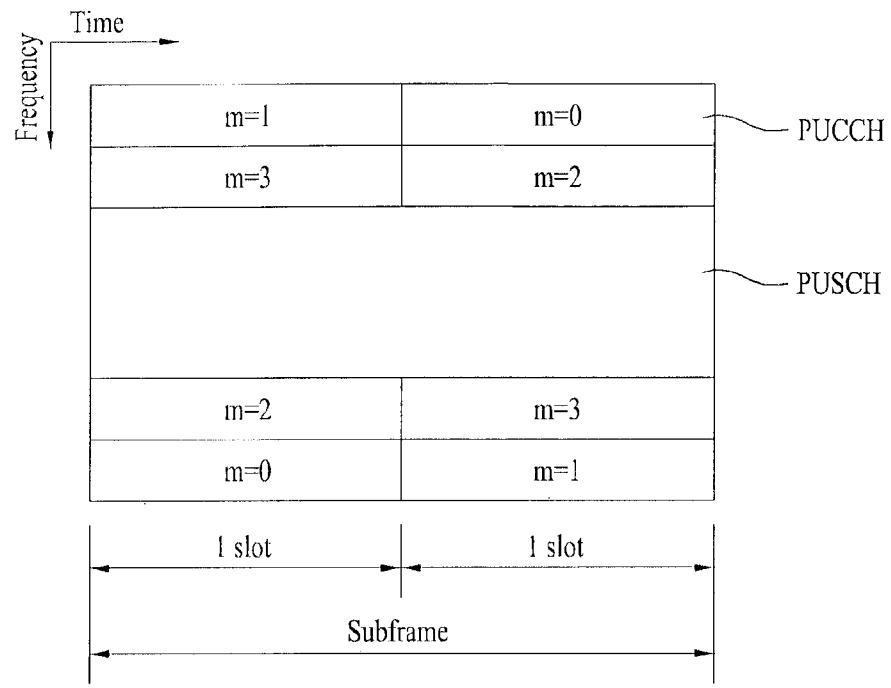
FIG. 6 is a view illustrating the structure of an uplink subframe used in an LTE system.

FIG. 6 illustrates the structure of an uplink subframe used in the LTE system.

Referring to FIG. 6, an uplink subframe is divided into a region to which a PUCCH is allocated to transmit control information and a region to which a PUSCH is allocated to transmit user data. The PUSCH is allocated to the middle of the subframe, whereas the PUCCH is allocated to both ends of a data region in the frequency domain. The control information transmitted on the PUCCH includes an ACK/NACK, a CQI representing a downlink channel state, an RI for Multiple Input and Multiple Output (MIMO), a Scheduling Request (SR) indicating a request for allocation of uplink resources, etc. A PUCCH of a UE occupies one Resource Block (RB) in a different frequency in each slot of a subframe. That is, two RBs allocated to the PUCCH frequency-hop over the slot boundary. Particularly, FIG. 6 illustrates an example in which PUCCHs for m=0, m=1, m=2, and m=3 are allocated to a subframe.

With the emergence and widespread use of various devices requiring Machine-to-Machine (M2M) communication and high transmission rate, data requirements for a cellular network in current wireless communication environments have rapidly increased. To meet required high data transmission rate, communication technology has developed into carrier aggregation technology for efficiently using more frequency bands, MIMO technology for raising data capacity in a limited frequency, and multi-BS cooperative technology. In addition, communication environments have evolved into increasing density of accessible nodes in the vicinity of a user. A system equipped with nodes with high density may have higher system performance by cooperation between nodes. Such a scheme provides much better performance than a non-cooperation scheme in which each node operates as an independent Base Station (BS), Advanced BS (ABS), Node-B (NB), eNode-B (eNB), or Access Point (AP).

The node may be implemented in the form of, for example, a Remote Radio Head (RRH) or an antenna node of a Distributed Antenna System (DAS). The DAS refers to a system for causing a single BS to manage antennas distributed at various locations in a cell, unlike a Centralized Antenna System (CAS) in which antennas are centralized in a cell. The DAS is also different from a femto/pico cell in that multiple antenna nodes constitute one cell.

In the initial stages, the DAS was used to repeatedly transmit signals by further installing antennas to cover a shadow area. However, the DAS may be considered a sort of a MIMO system because BS antennas can support one or plural users by simultaneously transmitting and receiving multiple data streams. Due to high frequency efficiency, the MIMO system has been recognized as an indispensable factor for satisfying requirements of next-generation communication. From the viewpoint of the MIMO system, the DAS has more advantages than the CAS, such as high power efficiency obtained by decrease in the distance between a user and an antenna, high channel capacity caused by low correlation and interference between BS antennas, and communication performance of relatively uniform quality irrespective of location of a user in a cell.

Figure 7:
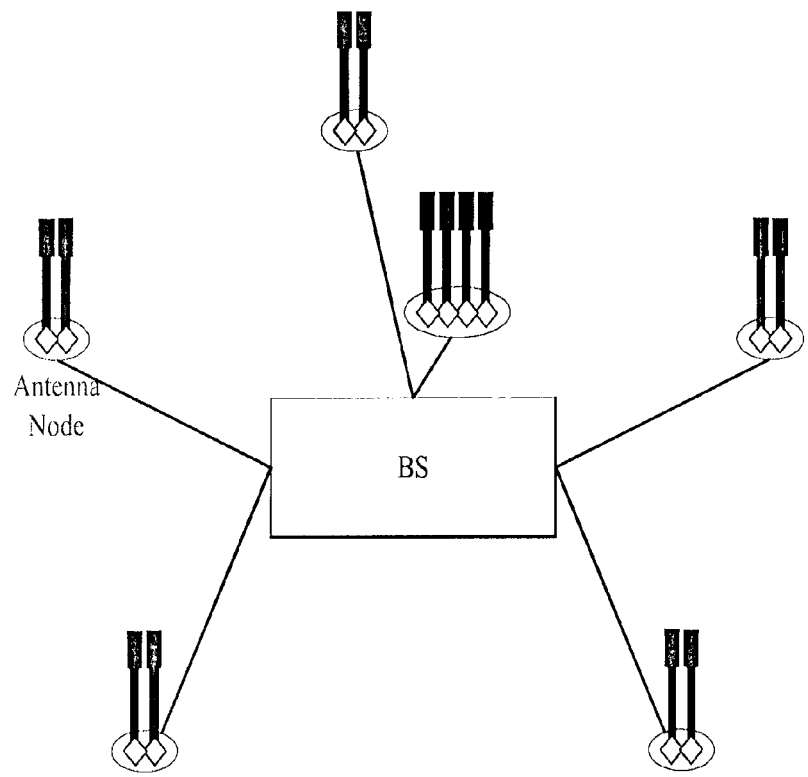
FIG. 7 is a view illustrating the configuration of a DAS in a next-generation communication system.

FIG. 7 is a view illustrating the configuration of a DAS in a next-generation communication system.

Referring to FIG. 7, the DAS includes a BS and antenna nodes connected to the BS. The antenna nodes are connected to the BS by wire or wirelessly. Each of the antenna nodes may include one to several antennas. Generally, antennas belonging to one antenna node have characteristics that the distance between the nearest antennas is less than a few meters and, therefore, the antennas belong to the same regional spot. An antenna node serves as an AP that a UE can access. In a conventional DAS, generally, no distinction is made between an antenna node and an antenna, as the antenna node and the antenna are treated the same. In actuality, however, the relationship between the antenna node and the antenna should certainly be defined to efficiently manage the DAS.

FIG. 8 is a view illustrating the concept of a Base Transceiver Station (BTS) hotel in a DAS.

FIG. 8(a) illustrates a conventional cellular system. As shown, one BTS manages three sectors and each BTS is connected to a Base Station Controller (BSC)/Radio Network Controller (RNC) through a backbone network.

However, in the DAS as shown in FIG. 8(b), BTSs connected to each antenna node are gathered in one place. This is referred to as a BTS hotel. In this system, costs for land and buildings in which the BTSs are to be installed can be reduced and maintenance and management for the BTS can be easily carried out in one place. In addition, backhaul capacity can be greatly increased by installing the BTS and the Mobile Station Center (MSC)/BSC/RNC in one place.

Hereinafter, a reference signal will be described in more detail.

Generally, to measure a channel, a Reference Signal (RS) known to a transmitting side and a receiving side is transmitted together with data from the transmitting side to the receiving side. Such an RS serves to perform a demodulation process by indicating a modulation scheme as well as channel measurement. The RS is classified into a dedicated RS (DRS), i.e. a UE-specific RS, for a BS and a specific UE and a Common RS, i.e. Cell-Specific RS (CRS), for all UEs in a cell. The CRS includes an RS for reporting a measurement result for CQI/PMI/RI measured in a UE to a BS and this RS is referred to as a Channel State Information-RS (CSI-RS).

In a legacy LTE system, an RS $r_{n_s}(m)$ is generated using a pseudo-random sequence c(n) to scramble a physical channel and the pseudo-random sequence c(n) is defined as indicated by Equation 8 using a length-31 Gold sequence.

[Equation 8]
$$r_{n_s}(m) = \frac{1}{\sqrt{2}}(1 - 2 \cdot c(2m)) + j\frac{1}{\sqrt{2}}(1 - 2 \cdot c(2m+1)),$$
$$m = 0, 1, \ldots, 12N_{RB}^{PDSCH} - 1$$
$$c(n) = (x_1(n + N_C) + x_2(n + N_C)) \bmod 2$$
$$x_1(n + 31) = (x_1(n + 3) + x_1(n)) \bmod 2$$
$$x_2(n + 31) = (x_2(n + 3) + x_2(n + 2) + x_2(n + 1) + x_2(n)) \bmod 2$$

In Equation 8, NC is 1600 and the first m-sequence has an initial value of 1 for x1(0) and 0 for x1(n) (where n is a value of 1 to 30). The initial value of the second m-sequence is defined as $c_{init} = \Sigma_{i=0}^{30} x_2(i) \cdot 2^i$ and is determined according to usage of the sequence.

In a cell-specific RS, i.e. a CRS, $c_{init}$ is defined as indicated by Equation 9. $c_{init}$ may be initialized every OFDM symbol.

$$c_{init} = 2^{10} \cdot (7 \cdot (n_s+1)+l+1) \cdot (2 \cdot N_{ID}^{cell}+1)+2 \cdot N_{ID}^{cell}+N_{CP} \quad \text{[Equation 9]}$$

In Equation 9, $n_s$ indicates a slot number of a radio frame and $N_{ID}^{cell}$ indicates a cell ID. In addition, $N_{CP}$ has a value of 1 in a normal CP and a value of 0 in an extended CP.

In a UE-specific RS, i.e. a DM-RS, $c_{init}$ is defined as expressed by Equation 10 in case of a single antenna port, i.e. antenna port 5, and may be initialized at a starting point of a subframe.

$$c_{init} = (\lfloor n_s/2 \rfloor + 1) \cdot (2N_{ID}^{cell}+1) \cdot 2^{16}+n_{RNTI} \quad \text{[Equation 10]}$$

In Equation 10, $n_{RNTI}$ may have a different value according to application. That is, in semi-persistent transmission, a Semi-Persistent Scheduling (SPS)-RNTI is used and, in a non-semi-persistent transmission, a Cell (C)-RNTI may be used.

Furthermore, in a DM-RS for a maximum of 8 antenna ports ranging from antenna port 7 to antenna port 14, $c_{init}$ is defined as indicated by Equation 11 and may be initialized at a starting point of a subframe.

$$c_{init} = (\lfloor n_s/2 \rfloor + 1) \cdot (2n_{ID}^{(nSCID)}+1) \cdot 2^{16}+n_{SCID} \quad \text{[Equation 11]}$$

In $n_{ID}^{(nSCID)}$ of Equation 11, $n_{SCID}$ has a value of 0 or 1. $n_{ID}^{(nSCID)}$ may be $n_{ID}^{DMRS,i}$ or $N_{ID}^{cell}$ which is given through downlink control information.

Figure 10:
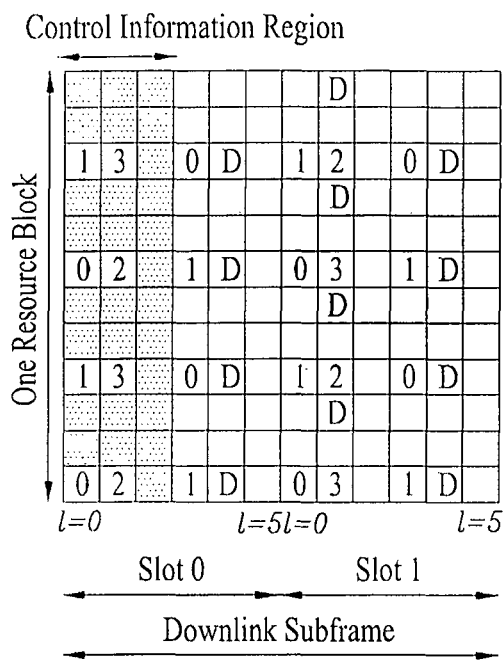

FIG. 9 and FIG. 10 are views illustrating the structure of RSs in an LTE system supporting downlink transmission using four antennas. Specifically, FIG. 9 illustrates the structure of the RS in a normal CP and FIG. 10 illustrates the structure of the RS in an extended CP.

Referring to FIGS. 9 and 10, numbers 0 to 3 denoted in lattices indicate CRSs, i.e. cell-specific RSs, transmitted for channel measurement and data demodulation in correspondence to antenna ports 0 to 3, respectively. The CRSs may be transmitted to the UE in all control information regions as well as in data information regions.

In addition, 'D's denoted in lattices indicate downlink Demodulation-RSs (DM-RSs) which are UE-specific RSs. The DM-RSs support transmission of a single antenna port through a data region, i.e. through a PDSCH. Whether or not the DM-RS, which is a UE-specific RS, is present is signaled to the UE through higher layers. In FIGS. 9 and 10, DM-RSs corresponding to an antenna port 5 are illustrated. In the 3GPP standard document 36.211, DM-RSs for a total of 8 antenna ports, from an antenna port 7 to an antenna port 14, are defined.

Figure 11:
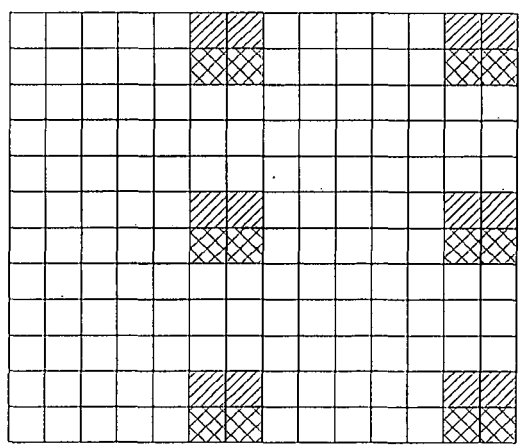
FIG. 11 illustrates an example of downlink DM-RS allocation defined in a current 3GPP standard document.

FIG. 11 illustrates an example of downlink DM-RS allocation defined in the current 3GPP standard document.

Referring to FIG. 11, DM-RSs corresponding to antenna ports {#7, #8, #11, #13} are mapped using a sequence per antenna port in a DM-RS group 1. DM-RSs corresponding to antenna ports {#9, #10, #12, #14} are also mapped using a sequence per antenna port in a DM-RS group 2. During mapping of a sequence corresponding to each antenna port, an Orthogonal Cover Code (OCC) predefined for each antenna port as shown in the following Table 1 is applied so that mapping is performed by a code division multiplexing scheme.

TABLE 1

| Antenna port p | [$\bar{w}_p(0)$ $\bar{w}_p(1)$ $\bar{w}_p(2)$ $\bar{w}_p(3)$] |
| --- | --- |
| 7 | [+1 +1 +1 +1] |
| 8 | [+1 −1 +1 −1] |
| 9 | [+1 +1 +1 +1] |
| 10 | [+1 −1 +1 −1] |
| 11 | [+1 +1 −1 −1] |
| 12 | [−1 −1 +1 +1] |
| 13 | [+1 −1 −1 +1] |
| 14 | [−1 +1 +1 −1] |

Meanwhile, the above-described CSI-RS has been proposed for the purpose of channel measurement for a PDSCH, separately from the CRS. Unlike the CRS, the CSI-RS may be defined as a maximum of 32 different CSI-RS configurations to reduce Inter-Cell Interference (ICI) in a multi-cell environment.

A CSI-RS configuration varies according to the number of antenna ports. CSI-RSs configured as differently as possible between neighboring cells are defined. The CSI-RS supports a maximum of 8 antennas unlike the CRS. In the 3GPP standard document, a total of 8 antennas, from an antenna port 15 to an antenna port 22, is allocated as antenna ports for the CSI-RS. The following Table 2 and Table 3 show CSI-RS configurations defined in the 3GPP standard document. Specially, Table 2 shows CSI-RS configurations in a normal CP and Table 3 shows CSI-RS configurations in an extended CP.

TABLE 2

| | | \multicolumn{6}{c}{Number of CSI reference signals configured} | | | | | |
| | CSI reference signal | 1 or 2 | | 4 | | 8 | |
| | configuration | (k', l') | $n_s$ mod 2 | (k', l') | $n_s$ mod 2 | (k', l') | $n_s$ mod 2 |
|---|---|---|---|---|---|---|---|
| Frame | 0 | (9, 5) | 0 | (9, 5) | 0 | (9, 5) | 0 |
| | 1 | (11, 2) | 1 | (11, 2) | 1 | (11, 2) | 1 |
| | 2 | (9, 2) | 1 | (9, 2) | 1 | (9, 2) | 1 |
| | 3 | (7, 2) | 1 | (7, 2) | 1 | (7, 2) | 1 |
| | 4 | (9, 5) | 1 | (9, 5) | 1 | (9, 5) | 1 |
| | 5 | (8, 5) | 0 | (8, 5) | 0 | | |
| | 6 | (10, 2) | 1 | (10, 2) | 1 | | |
| | 7 | (8, 2) | 1 | (8, 2) | 1 | | |
| | 8 | (6, 2) | 1 | (6, 2) | 1 | | |
| | 9 | (8, 5) | 1 | (8, 5) | 1 | | |
| | 10 | (3, 5) | 0 | | | | |
| | 11 | (2, 5) | 0 | | | | |
| | 12 | (5, 2) | 1 | | | | |
| | 13 | (4, 2) | 1 | | | | |
| | 14 | (3, 2) | 1 | | | | |
| | 15 | (2, 2) | 1 | | | | |
| | 16 | (1, 2) | 1 | | | | |
| | 17 | (0, 2) | 1 | | | | |
| | 18 | (3, 5) | 1 | | | | |
| | 19 | (2, 5) | 1 | | | | |
| Frame structure type 2 only | 20 | (11, 1) | 1 | (11, 1) | 1 | (11, 1) | 1 |
| | 21 | (9, 1) | 1 | (9, 1) | 1 | (9, 1) | 1 |
| | 22 | (7, 1) | 1 | (7, 1) | 1 | (7, 1) | 1 |
| | 23 | (10, 1) | 1 | (10, 1) | 1 | | |
| | 24 | (8, 1) | 1 | (8, 1) | 1 | | |
| | 25 | (6, 1) | 1 | (6, 1) | 1 | | |
| | 26 | (5, 1) | 1 | | | | |
| | 27 | (4, 1) | 1 | | | | |
| | 28 | (3, 1) | 1 | | | | |
| | 29 | (2, 1) | 1 | | | | |
| | 30 | (1, 1) | 1 | | | | |
| | 31 | (0, 1) | 1 | | | | |

TABLE 3

| | | \multicolumn{6}{c}{Number of CSI reference signals configured} | | | | | |
| | CSI reference signal | 1 or 2 | | 4 | | 8 | |
| | configuration | (k', l') | $n_s$ mod 2 | (k', l') | $n_s$ mod 2 | (k', l') | $n_s$ mod 2 |
|---|---|---|---|---|---|---|---|
| Frame structure type 1 and 2 | 0 | (11, 4) | 0 | (11, 4) | 0 | (11, 4) | 0 |
| | 1 | (9, 4) | 0 | (9, 4) | 0 | (9, 4) | 0 |
| | 2 | (10, 4) | 1 | (10, 4) | 1 | (10, 4) | 1 |
| | 3 | (9, 4) | 1 | (9, 4) | 1 | (9, 4) | 1 |
| | 4 | (5, 4) | 0 | (5, 4) | 0 | | |
| | 5 | (3, 4) | 0 | (3, 4) | 0 | | |
| | 6 | (4, 4) | 1 | (4, 4) | 1 | | |
| | 7 | (3, 4) | 1 | (3, 4) | 1 | | |
| | 8 | (8, 4) | 0 | | | | |
| | 9 | (6, 4) | 0 | | | | |
| | 10 | (2, 4) | 0 | | | | |
| | 11 | (0, 4) | 0 | | | | |
| | 12 | (7, 4) | 1 | | | | |
| | 13 | (6, 4) | 1 | | | | |
| | 14 | (1, 4) | 1 | | | | |
| | 15 | (0, 4) | 1 | | | | |
| Frame structure type 2 only | 16 | (11, 1) | 1 | (11, 1) | 1 | (11, 1) | 1 |
| | 17 | (10, 1) | 1 | (10, 1) | 1 | (10, 1) | 1 |
| | 18 | (9, 1) | 1 | (9, 1) | 1 | (9, 1) | 1 |
| | 19 | (5, 1) | 1 | (5, 1) | 1 | | |
| | 20 | (4, 1) | 1 | (4, 1) | 1 | | |
| | 21 | (3, 1) | 1 | (3, 1) | 1 | | |
| | 22 | (8, 1) | 1 | | | | |
| | 23 | (7, 1) | 1 | | | | |
| | 24 | (6, 1) | 1 | | | | |
| | 25 | (2, 1) | 1 | | | | |
| | 26 | (1, 1) | 1 | | | | |
| | 27 | (0, 1) | 1 | | | | |

In Table 2 and Table 3, (k',l') denotes an RE index, k' denotes a subcarrier index, and l' denotes an OFDM symbol index. FIG. 12 illustrates CSI-RS configuration #0 in a normal CP among CSI-RS configurations defined in the current 3GPP standard document.

In addition, a CSI-RS subframe configuration may be defined. The CSI-RS subframe configuration is represented by a periodicity $T_{CSI-RS}$ and a subframe offset $\Delta_{CSI-RS}$, expressed in subframes. The following Table 4 indicates CSI-RS subframe configurations defined in the 3GPP standard document.

TABLE 3

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
|---|---|---|
| 0-4 | 5 | $I_{CSI-RS}$ |
| 5-14 | 10 | $I_{CSI-RS}$ − 5 |
| 15-34 | 20 | $I_{CSI-RS}$ − 15 |
| 35-74 | 40 | $I_{CSI-RS}$ − 35 |
| 75-154 | 80 | $I_{CSI-RS}$ − 75 |

For a future LTE system, introduction of a local area has been considered. That is, to intensify service support per user, new cell deployment of the concept of local area access is expected to be introduced.

Figure 13:
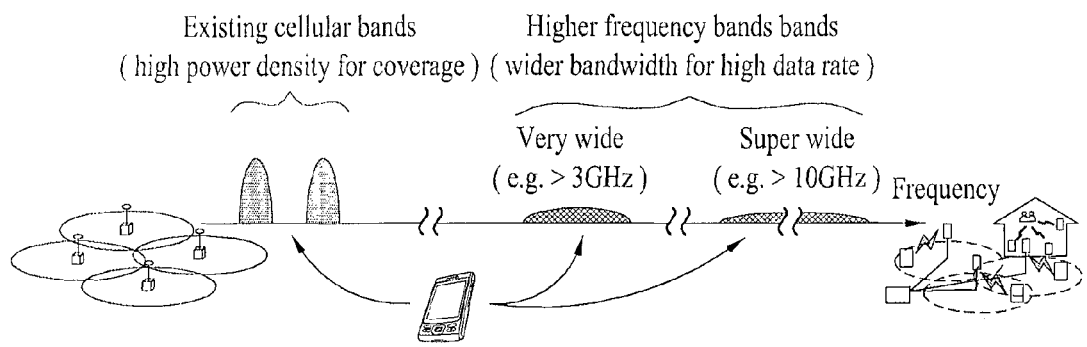
FIG. 13 is a view illustrating the concept of a small cell which is expected to be introduced in a future LTE system.

FIG. 13 is a view illustrating the concept of a small cell which is expected to be introduced in a future LTE system.

Referring to FIG. 13, it is expected to configure a wider system bandwidth in a Frequency band having a higher center frequency rather than in a frequency band operating in a legacy LTE system. Basic cell coverage is supported based on a control signal such as system information through an existing cellular band and, in a small cell of a higher frequency band, data transmission for maximizing transmission efficiency may be performed using a wider frequency bandwidth. Accordingly, in the concept of local area access, target UEs may correspond to UEs having low to medium mobility located at a narrower area and target cells may correspond to small cells in which the distance between the UE and the BS is a few hundred meters which is shorter than an existing cell of a few kilometers.

In these cells, the distance between the UE and the BS is short and a high frequency band is used. As a result, the following channel characteristics may be expected.

First, in an aspect of delay spread, a signal delay may be shortened as the distance between the BS and the UE decreases. Additionally, in an aspect of a subcarrier spacing, when an OFDM-based frame, which is the same as in the LTE system, is applied, a much larger value than an existing 15 KHz may be set as the subcarrier spacing because an assigned frequency band is relatively large. Last, in an aspect of a Doppler frequency, a higher Doppler frequency at the same movement speed of a UE is obtained due to use of a high frequency band and, thus, a coherence time may be remarkably shortened. The coherence time refers to a time duration during which channels have static or uniform characteristics over time. A coherence bandwidth refers to bandwidth in which channels show static or uniform characteristics over time.

Meanwhile, in recent 3GPP standard, an Active Antenna System (AAS) based planar antenna, i.e. a 2-Dimensional (2D) array antenna, has been discussed. A Radio Frequency (RF) module is installed in each antenna port and the antenna port is mapped to each 2D antenna sub-array, thereby forming an AAS BS having a 2D array antenna structure. The RF module, which is split per antenna port, may perform independent amplitude and phase control and may provide an elevation region in a vertical direction, separately from existing horizontal domain beamforming.

An example of using the characteristics of the 2D array antenna is vertical cell splitting.

Figure 14:
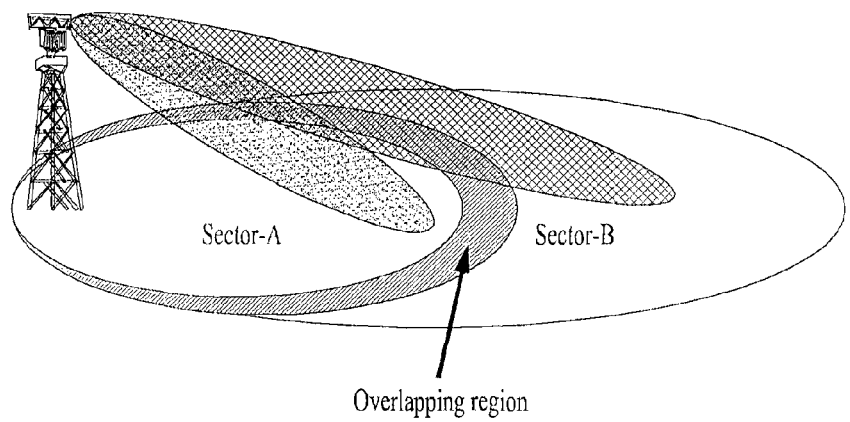
FIG. 14 illustrates the concept of vertical cell splitting using a 2D array antenna.

FIG. 14 illustrates the concept of vertical cell splitting using a 2D array antenna. Specifically, in FIG. 14, it is assumed that two vertical sectors are configured in the same cell using an amplitude weight and a phase shift of each antenna element of the 2D array antenna.

Referring to FIG. 14, multiple beams are formed in different directions. That is, multiple different cells, which are distinguished in horizontal and vertical directions, are within the range of the same eNB. In each cell, the same time-frequency resources may be reused to increase cell capacity.

In this case, in a region in which vertical sectors overlap, resources may overlap or collide due to use of the same time-frequency resources and DM-RS transmission for UEs serviced in each region may also create mutual interference due to resource overlap. Accordingly, accuracy of channel estimation between the vertical sectors may decrease, thereby generating a problem in demodulation of a data channel.

The present invention proposes a method for maintaining DM-RS based channel estimation performance in order to solve an interference problem of the data channel between a single BS and multiple UEs.

<First Embodiment>

In the first embodiment of the present invention, plural antennas of a 2D array antenna are grouped to configure virtual antenna ports #7 to #14 and different antenna port start indexes of DM-RSs are allocated to vertical sectors, thereby keeping DM-RS antenna ports allocated to UEs per sector as different as possible.

In other words, when a plurality of UEs shares a plurality of time-frequency resources, e.g. RBs, in vertical sectors, different physical DM-RS antenna ports are allocated first, so that a DM-RS overlapping phenomenon capable of being generated between UEs using the same RB may be reduced.

Figure 15:
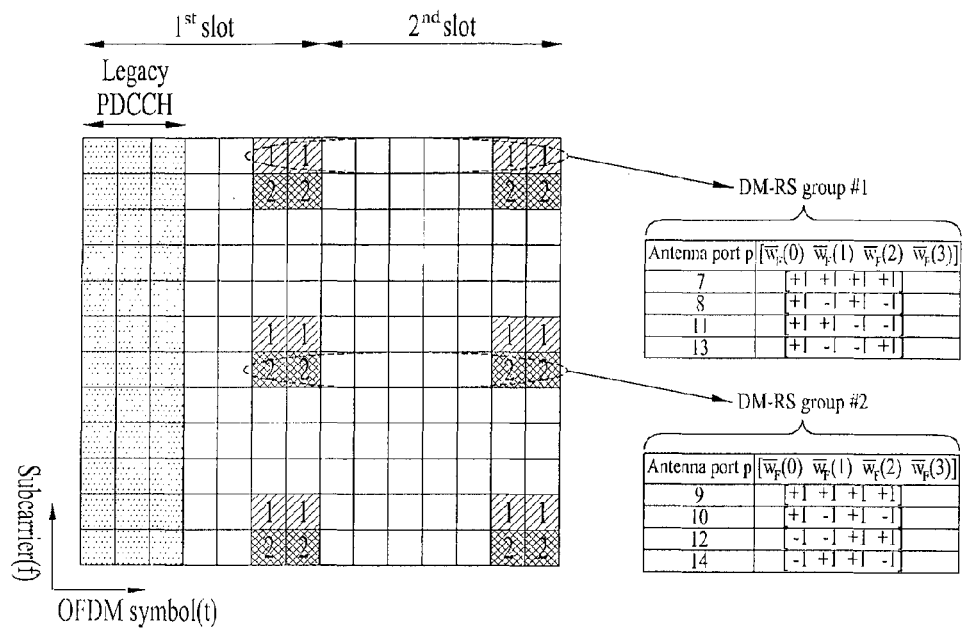
FIG. 15 illustrates an example of allocating DM-RS antenna ports according to a first embodiment of the present invention.

FIG. 15 illustrates an example of allocating DM-RS antenna ports according to a first embodiment of the present invention.

Referring to FIG. 15, in an LTE system, DM-RS resources are allocated to UEs in order of DM-RS antenna ports {#7, #8, #9, #10, #11, #12, #13, #14}. In accordance with the first embodiment of the present invention, the following assignment may be performed so that DM-RS resources that are as orthogonal as possible may be allocated to UEs of a sector-A and a sector-B:

1) DM-RS antenna port logical indexes={#7, #8, #9, #10, #11, #12, #13, #14}

2) DM-RS antenna port physical indexes={#7, #8, #11, #13, #9, #10, #12, #14}

More specifically, the DM-RS logical indexes are allocated to UEs of the sector-A and the DM-RS logical indexes+a shift value (shift_value) are allocated to UEs of the sector-B. That is, the UEs of the sector-A first use DM-RS antenna port physical indexes {#7, #8, #11, #13} according to allocation of DM-RS antenna port logical indexes {#7, #8, #9, #10}. If the shift value 4 is used, according to allocation of DM-RS antenna port logical indexes {#11, #12, #13, #14}, the UEs of the sector-B use DM-RS antenna port physical indexes {#9, #10, #12, #14}. Through this process, orthogonal DM-RS resources are allocated for data channel transmission of at least rank 4 or less for each UE, thereby stably performing channel estimation. Even in this case, in data channel transmission of rank 5 or more, resource overlapping or resource collision may occur.

<Second Embodiment>

In the second embodiment of the present invention, plural antennas of a 2D array antenna are grouped to configure virtual antenna ports #7 to #14 and a BS allocates different zero-power DM-RS antenna ports to UEs serviced in an overlapping vertical sector region, thereby preventing DM-RS interference between sectors.

Specifically, the BS allocates a different zero-power DM-RS antenna port pattern according to a vertical sector to the UEs and transmits corresponding information to the UEs. Then, the UEs use a different DM-RS antenna port per sector in which the UEs is positioned. That is, from the viewpoint of the UEs, an operation similar to restriction of the number of actually usable DM-RS antennas caused by allocation of the zero-power DM-RS antenna ports is performed. For example, it is assumed that the following pattern per sector is defined.

1) Sector-A: zero-power DM-RS pattern {#7, #8, #11, #13}
2) Sector-B: zero-power DM-RS pattern {#9, #10, #12, #14}

Here, in transmission of rank 4, UEs located in the sector-A perform channel estimation for data channel demodulation using DM-RS antenna ports {#9, #10, #12, #14} except for DM-RS antenna ports {#7, #8, #11, #13}. On the contrary, UEs located in the sector-B performs channel estimation for data channel demodulation using DM-RS antenna ports {#7, #8, #11, #13} except for DM-RS antenna ports {#9, #10, #12, #14}.

<Third Embodiment>

In the third embodiment of the present invention, plural antennas of a 2D array antenna are grouped to configure virtual antenna ports #7 to #14 and a BS assigns a different virtual cell ID or RNTI or a different scrambling ID (SCID) per vertical sector, thereby maintaining sequences of quasi-orthogonal characteristics between DM-RSs.

Accordingly, even for UEs to which the same DM-RS antenna port per vertical sector is allocated for channel estimation for data channel demodulation, additional orthogonality may be ensured using a quasi-orthogonal sequence. That is, if orthogonality needs to be additionally ensured even after orthogonal DM-RS resources are allocated through the above-described first or second embodiment, quasi-orthogonal characteristics of the pseudo-random sequence of the above Equation 11 are used.

Figure 16:
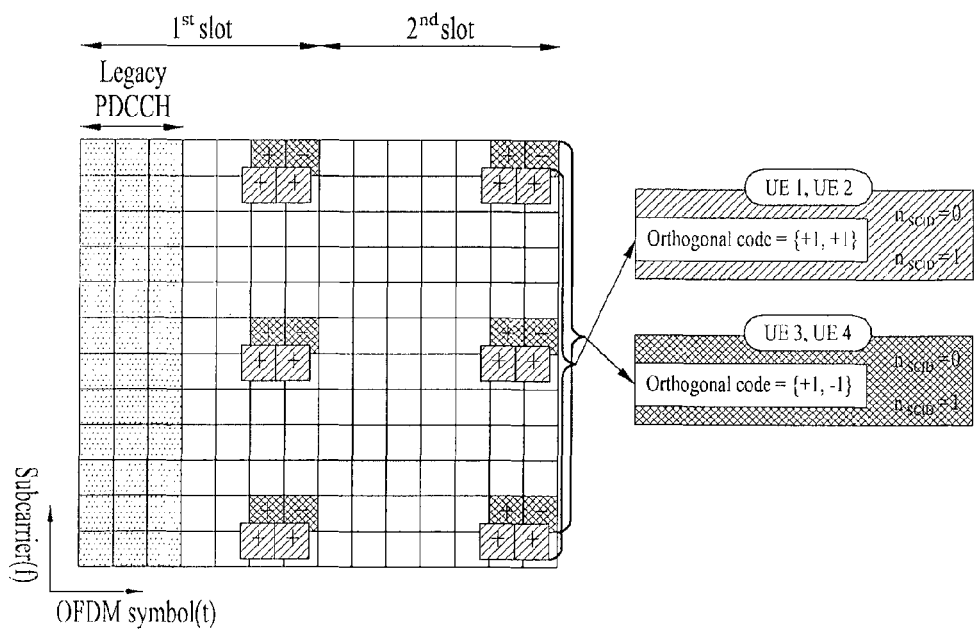
FIG. 16 illustrates an example of ensuring additional DM-RS orthogonality according to a third embodiment of the present invention.

FIG. 16 illustrates an example of ensuring additional DM-RS orthogonality according to a third embodiment of the present invention. It is assumed in FIG. 16 that UEs UE#1 and UE#3 are located in a sector-A and UEs UE#2 and UE#4 are located in a sector-B.

Referring to FIG. 16, code division multiplexing (CDD) is performed on a DM-RS in the time domain by using an orthogonal cover code (OCC) during DM-RS allocation and $n_{SCID}$ is set to 0 or 1 to perform DM-RS allocation of quasi-orthogonal characteristics, thereby enabling channel estimation between the UEs UE#1 and UE#2 and the UEs UE#3 and UE#4 in different vertical sectors. That is, since $n_{SCID}=n_{RNTI}=\{0,1\}$, a quasi-orthogonal pseudo-random sequence is generated.

Meanwhile, the BS may command the UE to perform the operations of the above-described first to third embodiments by transmitting information about vertical sectors. In other words, the BS may directly transmit information regarding a vertical sector to which the UE belongs to the UE to cause the UE to perform a proper operation among the first to third embodiments. In this case, the information transmitted by the BS to the UE may be expressed as a bitmap or a virtual cell ID. For example, assuming that a total of 4 vertical sectors is present, the information expressed as only two bits may be transmitted or the virtual cell ID itself may be transmitted.

According to the above-described present invention, stable data reception performance of the UE can be maximized by allocating DM-RS resources that are as orthogonal as possible in an overlapping region between vertical sectors.

Figure 17:
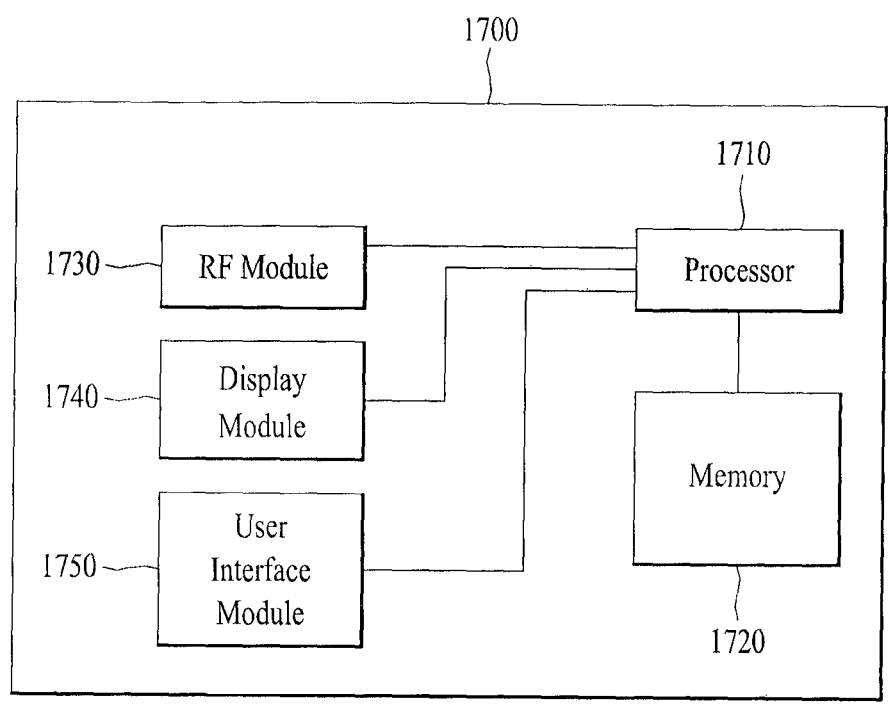
FIG. 17 is a block diagram illustrating a communication apparatus in accordance with an embodiment of the present invention.

FIG. 17 is a block diagram illustrating a communication apparatus in accordance with an embodiment of the present invention.

Referring to FIG. 17, a communication device 1700 includes a processor 1710, a memory 1720, an Radio Frequency (RF) module 1730, a display module 1740, and a user interface module 1750.

The communication device 1700 is illustrated for convenience of the description and some modules may be omitted. Moreover, the communication device 1700 may further include necessary modules. Some modules of the communication device 1700 may be further divided into sub-modules. The processor 1700 is configured to perform operations according to the embodiments of the present invention exemplarily described with reference to the figures. Specifically, for the detailed operations of the processor 1700, reference may be made to the contents described with reference to FIGS. 1 to 16.

The memory 1720 is connected to the processor 1710 and stores operating systems, applications, program code, data, and the like. The RF module 1730 is connected to the processor 1710 and performs a function of converting a baseband signal into a radio signal or converting a radio signal into a baseband signal. For this, the RF module 1730 performs analog conversion, amplification, filtering, and frequency upconversion or inverse processes thereof. The display module 1740 is connected to the processor 1710 and displays various types of information. The display module 1740 may include, but is not limited to, a well-known element such as a Liquid Crystal Display (LCD), a Light Emitting Diode (LED), or an Organic Light Emitting Diode (OLED). The user interface module 1750 is connected to the processor 1710 and may include a combination of well-known user interfaces such as a keypad and a touchscreen.

The above-described embodiments are combinations of elements and features of the present invention in a predetermined manner. Each of the elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. In the appended claims, it will be apparent that claims that are not explicitly dependent on each other can be combined to provide an embodiment or new claims can be added through amendment after the application is filed.

The embodiments according to the present invention can be implemented by various means, for example, hardware, firmware, software, or combinations thereof. In the case of a hardware configuration, the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In the case of a firmware or software configuration, the method according to the embodiments of the present invention may be implemented by a type of a module, a procedure, or a function, which performs functions or operations described above. For example, software code may be stored in a memory unit and then may be executed by a processor. The memory unit may be located inside or outside the processor to transmit and receive data to and from the processor through various well-known means.

The present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents and all changes coming within the meaning and equivalency range of the appended claims are intended to be embraced therein.

INDUSTRIAL APPLICABILITY

While the above-described method for transmitting and receiving a planar antenna based reference signal in a wireless communication system, and an apparatus therefor have been described centering on an example applied to the 3GPP LTE system, the present invention is applicable to a variety of wireless communication systems in addition to the 3GPP LIE system.

The invention claimed is:

1. A method for transmitting signals to a user equipment at a base station via a 2-dimensional planar antenna in a wireless communication system, comprising:
   generating a user equipment specific reference signal for the user equipment;
   determining logical antenna ports for the user equipment specific reference signal corresponding to a first vertical sector in which the user equipment is located among a plurality of vertical sectors managed by the base station; and
   transmitting the user equipment specific reference signal to the user equipment using the determined logical antenna ports,
   wherein the plurality of vertical sectors are cell coverage regions formed according to vertical direction beamforming of the 2-dimensional planar antenna,
   wherein the logical antenna ports corresponding to the first vertical sector are not overlapped with logical antenna ports for the user equipment specific reference signal corresponding to a second vertical sector among the plurality of vertical sectors,
   wherein same resource blocks are assigned to the first and second vertical sectors.

2. The method according to claim 1, wherein determining the logical antenna ports comprises:
   defining indexes of the logical antenna ports for the user equipment specific reference signal in order of physical antenna ports to which the user equipment specific reference signal is allocated; and
   determining a starting index of the logical antenna ports for the user equipment.

3. The method according to claim 1, wherein determining the logical antenna ports comprises transmitting information about the logical antenna ports of a zero-power user equipment specific reference signal corresponding to the first vertical sector to the user equipment,
   wherein the logical antenna ports of the zero-power user equipment specific reference signal are the logical antenna ports corresponding to the second vertical sector.

4. A method for receiving signals from a base station at a user equipment in a wireless communication system, comprising:
   receiving a user equipment specific reference signal transmitted via a 2-dimensional planar antenna from the base station using logical antenna ports for the user equipment specific reference signal corresponding to a first vertical sector in which the user equipment is located among a plurality of vertical sectors managed by the base station,
   wherein the plurality of vertical sectors are cell coverage regions formed according to vertical direction beamforming of the 2-dimensional planar antenna,
   wherein the logical antenna ports corresponding to the first vertical sector are not overlapped with logical antenna ports for the user equipment specific reference signal corresponding to a second vertical sector among the plurality of vertical sectors,
   wherein same resource blocks are assigned to the first and second vertical sectors.

5. The method according to claim 4, further comprising:
   receiving information about a starting index of the logical antenna ports for the user equipment specific reference signal from the base station,
   wherein indexes of the logical antenna ports for the user equipment specific reference signal is defined in order of physical antenna ports to which the user equipment specific reference signal is allocated.

6. The method according to claim 4, further comprising:
   receiving information about logical antenna ports of a zero-power user equipment specific reference signal corresponding to the first vertical sector from the base station; and
   wherein the logical antenna ports of the zero-power user equipment specific reference signal are the logical antenna ports corresponding to the second vertical sector.

7. A base station in a wireless communication system, comprising:
   a radio communication module for transmitting and receiving signals to and from a user equipment; and
   a processor for processing the signals,
   wherein the processor controls the radio communication module to generate a user equipment specific reference signal for the user equipment, determine logical antenna ports for the user equipment specific reference signal corresponding to a first vertical sector in which the user equipment is located among a plurality of vertical sectors managed by the base station, and transmit the user equipment specific reference signal to the user equipment using the determined logical antenna ports,
   wherein the plurality of vertical sectors are cell coverage regions formed according to vertical direction beamforming of the 2-dimensional planar antenna,
   wherein the logical antenna ports corresponding to the first vertical sector are not overlapped with logical antenna ports for the user equipment specific reference signal corresponding to a second vertical sector among the plurality of vertical sectors, wherein same resource blocks are assigned to the first and second vertical sectors.

8. A user equipment in a wireless communication system, comprising:

a radio communication module for transmitting and receiving signals to and from a base station; and a processor for processing the signals, wherein the processor controls the radio communication module to receive a user equipment specific reference signal transmitted via a 2-dimensional planar antenna from the base station using logical antenna ports for the user equipment specific reference signal corresponding to a first vertical sector in which the user equipment is located among a plurality of vertical sectors managed by the base station, wherein the plurality of vertical sectors are cell coverage regions formed according to vertical direction beamforming of the 2-dimensional planar antenna, wherein the logical antenna ports corresponding to the vertical sector are not overlapped with logical antenna ports for the user equipment specific reference signal corresponding to a second vertical sector among the plurality of vertical sectors, wherein same resource blocks are assigned to the first and second vertical sectors.

\* \* \* \* \*